US012769163B2

(12) United States Patent
Otsuka et al.

(10) Patent No.: US 12,769,163 B2
(45) Date of Patent: Oct. 20, 2026

(54) OPTICAL FILM AND METHOD FOR PRODUCING OPTICAL FILM

(71) Applicant: NITTO DENKO CORPORATION, Ibaraki (JP)

(72) Inventors: Masanori Otsuka, Ibaraki (JP); Mariko Hirai, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 18/849,725

(22) PCT Filed: Mar. 23, 2023

(86) PCT No.: PCT/JP2023/011494
§ 371 (c)(1),
(2) Date: Sep. 23, 2024

(87) PCT Pub. No.: WO2023/190029
PCT Pub. Date: Oct. 5, 2023

(65) Prior Publication Data
US 2025/0199354 A1 Jun. 19, 2025

(30) Foreign Application Priority Data
Mar. 30, 2022 (JP) ................................ 2022-055567

(51) Int. Cl.
*G02F 1/1334* (2006.01)
*C09K 19/54* (2006.01)
*G02F 1/1337* (2006.01)

(52) U.S. Cl.
CPC .......... *G02F 1/1334* (2013.01); *C09K 19/544* (2013.01); *G02F 1/133788* (2013.01); *C09K 2219/03* (2013.01)

(58) Field of Classification Search
CPC .................................................... G02F 1/1334
(Continued)

(56) References Cited

U.S. PATENT DOCUMENTS 6,864,951 B1 * 3/2005 Ren ........................ C09K 19/02 349/200
6,952,310 B1 10/2005 Miyatake et al.
(Continued)

FOREIGN PATENT DOCUMENTS

JP 2000-214443 A 8/2000
JP 2000-352623 A 12/2000
(Continued)

OTHER PUBLICATIONS

International Search Report issued for corresponding International Patent Application No. PCT/JP2023/011494 on Jun. 6, 2023, along with an English translation (7 pages).
(Continued)

*Primary Examiner* — Christopher M Raabe
(74) *Attorney, Agent, or Firm* — Hauptman Ham, LLP

(57) ABSTRACT

The present invention provides an optical film, including a diffusion layer including a polymer matrix and dispersed particles dispersed in the polymer matrix, the dispersed particles each containing a liquid crystal polymer that is a polymer of a polymerizable liquid crystal compound, wherein the diffusion layer includes a plurality of regions different from each other in alignment state of the liquid crystal polymer and/or in content ratio of the liquid crystal polymer.

16 Claims, 6 Drawing Sheets

(58) Field of Classification Search
USPC .............................................................. 349/56
See application file for complete search history.

(56) References Cited

U.S. PATENT DOCUMENTS

| | | | |
|---|---|---|---|
| 7,446,938 | B2 | 11/2008 | Miyatake et al. |
| 7,515,339 | B2 | 4/2009 | Miyatake et al. |
| 7,532,398 | B2 | 5/2009 | Miyatake et al. |
| 8,962,103 | B2 | 2/2015 | Lee et al. |
| 9,372,295 | B2 | 6/2016 | Chang et al. |
| 2003/0117707 | A1 | 6/2003 | Uchida et al. |
| 2004/0246581 | A1 | 12/2004 | Miyatake et al. |
| 2006/0193047 | A1 | 8/2006 | Miyatake et al. |
| 2006/0215265 | A1 | 9/2006 | Miyatake et al. |
| 2006/0232861 | A1 | 10/2006 | Miyatake et al. |
| 2007/0014007 | A1 | 1/2007 | Miyatake et al. |
| 2012/0224126 | A1 | 9/2012 | Chang et al. |
| 2012/0320306 | A1 | 12/2012 | Lee et al. |
| 2015/0123031 | A1 | 5/2015 | Chen et al. |
| 2017/0138568 | A1 | 5/2017 | Liu et al. |
| 2017/0269396 | A1* | 9/2017 | Northrup .............. G02F 1/1333 |
| 2019/0264034 | A1* | 8/2019 | Endo ................ B29D 11/00788 |
| 2020/0400980 | A1* | 12/2020 | Hsieh ...................... G06F 21/84 |
| 2021/0284766 | A1* | 9/2021 | Endo ......................... G09F 9/30 |
| 2024/0010917 | A1* | 1/2024 | Enya ..................... G02F 1/1334 |

FOREIGN PATENT DOCUMENTS

| | | | |
|---|---|---|---|
| JP | 2002-267812 | A | 9/2002 |
| JP | 2011-8005 | A | 1/2011 |
| JP | 2020-109441 | A | 7/2020 |
| TW | I466775 | B | 1/2015 |
| TW | I567124 | B | 1/2017 |

OTHER PUBLICATIONS

Written Opinion issued for corresponding International Patent Application No. PCT/JP2023/011494 on Jun. 6, 2023 (4 pages).
Office Action issued on Aug. 18, 2026 for corresponding Taiwanese Patent Application No. 112111877, along with an English translation (11 pages).

* cited by examiner

OPTICAL FILM AND METHOD FOR PRODUCING OPTICAL FILM

CROSS-REFERENCE TO RELATED APPLICATIONS

This application is a National Stage of International Application No. PCT/JP2023/011494, filed on Mar. 23, 2023, which designates the United States and was published in Japan, and which is based upon and claims priority to Japanese Patent Application No. 2022-055567 filed on Mar. 30, 2022 in the Japan Patent Office. All of the aforementioned applications are hereby incorporated by reference in their entireties.

TECHNICAL FIELD

The present invention relates to an optical film including a diffusion layer and a method of producing the optical film.

BACKGROUND ART

A polymer dispersed liquid crystal (hereinafter sometimes referred to as "PDLC") film including a PDLC layer between a pair of transparent electrode layers is one type of light control film. The film can switch a state in which light is scattered (scattering state) and a state in which light is transmitted (non-scattering state or transparent state) by switching a voltage applied state and a no voltage applied state. Specifically, the PDLC layer includes a polymer matrix and droplets of a liquid crystal compound (hereinafter sometimes referred to as "liquid crystal droplets") dispersed in the polymer matrix. The liquid crystal droplets serve as scattering particles by virtue of, for example, a difference in refractive index between the liquid crystal compound in each of the liquid crystal droplets and the polymer matrix, and can thus cause light scattering.

The PDLC film may be utilized as a diffusion plate by utilizing the scattering effect. For example, in Patent Literature 1, there is a proposal of: producing a PDLC film including a part having a large degree of scattering and a part having a small degree of scattering by changing a UV irradiation intensity at the time of the production of the polymer matrix in accordance with sites; and using the PDLC film as a diffusion plate for a direct backlight.

However, in the technology as disclosed in Patent Literature 1, it is difficult to form the part having a large degree of scattering and the part having a small degree of scattering in a fine pattern.

CITATION LIST

Patent Literature

[PTL 1] JP 2011-008005 A

SUMMARY OF INVENTION

Technical Problem

A primary object of the present invention is to provide an optical film including a diffusion layer, the optical film including parts different from each other in degree of scattering in a desired pattern.

Solution to Problem

According to one aspect of the present invention, there is provided an optical film, including a diffusion layer including a polymer matrix and dispersed particles dispersed in the polymer matrix, the dispersed particles each containing a liquid crystal polymer that is a polymer of a polymerizable liquid crystal compound, wherein the diffusion layer includes a plurality of regions different from each other in alignment state of the liquid crystal polymer and/or in content ratio of the liquid crystal polymer.

In one embodiment, the plurality of regions are aligned in a predetermined pattern.

In one embodiment, a maximum value of differences between hazes of parts corresponding to the plurality of regions is 10% or more in plan view.

In one embodiment, the dispersed particles each further contain a liquid crystal compound.

In one embodiment, a content ratio of the liquid crystal polymer with respect to a total content of the liquid crystal polymer and the liquid crystal compound is 5 wt % or more.

In one embodiment, a total content ratio of the liquid crystal polymer and the liquid crystal compound, when present, in the diffusion layer is from 30 wt % to 70 wt %.

In one embodiment, the optical film further includes a first transparent substrate arranged on a first main surface side of the diffusion layer.

In one embodiment, the optical film further includes a second transparent substrate arranged on a second main surface side of the diffusion layer.

In one embodiment, the optical film is free of an electrode layer.

According to another aspect of the present invention, there is provided an optical film, including a diffusion layer including a polymer matrix and dispersed particles dispersed in the polymer matrix, the dispersed particles each containing a liquid crystal polymer that is a polymer of a polymerizable liquid crystal compound, wherein the optical film includes a plurality of regions exhibiting hazes different from each other in accordance with an alignment state of the liquid crystal polymer in plan view.

According to another aspect of the present invention, there is provided an optical film, including a diffusion layer including a polymer matrix and dispersed particles dispersed in the polymer matrix, wherein the diffusion layer includes: a region including dispersed particles each containing a polymerizable liquid crystal compound; and a region including dispersed particles each containing a liquid crystal polymer that is a polymer of the polymerizable liquid crystal compound, and wherein those regions exhibit hazes different from each other in plan view.

According to another aspect of the present invention, there is provided a method of producing an optical film, including: applying, to a first substrate, an application liquid containing a resin for forming a polymer matrix, a polymerizable liquid crystal compound, and a solvent to provide an applied layer; drying the applied layer to provide a polymer dispersed liquid crystal layer including a polymer matrix and droplets dispersed in the polymer matrix, the droplets each containing the polymerizable liquid crystal compound; and polymerizing the polymerizable liquid crystal compound while applying a voltage from a first main surface side and a second main surface side of the polymer dispersed liquid crystal layer so as to generate regions different from each other in electric field intensity.

In one embodiment, the application of the voltage is performed with a first electrode arranged on the first main surface side of the polymer dispersed liquid crystal layer and a second electrode arranged on the second main surface side thereof, and a separation distance between the first electrode and the second electrode is controlled so as to generate the regions different from each other in electric field intensity.

According to another aspect of the present invention, there is provided a method of producing an optical film, including: applying, to a first substrate, an application liquid containing a resin for forming a polymer matrix, a polymerizable liquid crystal compound, and a solvent to provide an applied layer; drying the applied layer to provide a polymer dispersed liquid crystal layer including a polymer matrix and droplets dispersed in the polymer matrix, the droplets each containing the polymerizable liquid crystal compound; and irradiating a predetermined region with an active energy ray under a state in which a voltage is applied to the polymer dispersed liquid crystal layer to polymerize the polymerizable liquid crystal compound.

In one embodiment, the application liquid is an emulsion containing, as a dispersoid, liquid crystal particles each containing the polymerizable liquid crystal compound.

In one embodiment, the application liquid further contains a non-polymerizable liquid crystal compound.

Advantageous Effects of Invention

The optical film according to the embodiment of the present invention includes the diffusion layer including the polymer matrix and the dispersed particles dispersed in the polymer matrix, the dispersed particles each containing the liquid crystal polymer that is the polymer of the polymerizable liquid crystal compound. The diffusion layer includes the plurality of regions different from each other in alignment state of the liquid crystal polymer and/or in content ratio of the liquid crystal polymer. The dispersed particles may exhibit different scattering properties in accordance with the alignment state of the liquid crystal polymer incorporated therein and/or the content ratio thereof. Thus, in the optical film having such configuration, the plurality of regions may exhibit different degrees of scattering in accordance with the alignment state of the liquid crystal polymer and/or the content ratio thereof. Accordingly, by adjusting the alignment state of the liquid crystal polymer and/or the content ratio thereof so as to achieve a desired pattern, the optical film including parts different from each other in degree of scattering in a desired pattern can be obtained.

DESCRIPTION OF EMBODIMENTS

Preferred embodiments of the present invention are described below. However, the present invention is not limited to these embodiments. In this description, the expression "from . . . to . . . " representing a numerical range includes the upper limit and lower limit numerical values thereof.

A. Optical Film

According to a first embodiment of the present invention, there is provided an optical film including a diffusion layer including a polymer matrix and dispersed particles dispersed in the polymer matrix, the dispersed particles each containing a liquid crystal polymer that is a polymer of a polymerizable liquid crystal compound, wherein the diffusion layer includes a plurality of regions different from each other in alignment state of the liquid crystal polymer. The dispersed particles may each further contain a liquid crystal compound. In each of the dispersed particles, the liquid crystal compound may be aligned along the liquid crystal polymer. Accordingly, the dispersed particles can exhibit different scattering properties in accordance with the alignment state of the liquid crystal polymer incorporated therein, and hence the optical film having such configuration can exhibit a degree of scattering (haze) in accordance with the alignment state of the liquid crystal polymer in each of the plurality of regions. Accordingly, in the optical film of the first embodiment, when the plurality of regions different from each other in degree of scattering (haze) are present in the optical film (more specifically, the diffusion layer) in plan view, it can be said that "the diffusion layer includes the plurality of regions different from each other in alignment state of the liquid crystal polymer." Further, the optical film of the first embodiment may be an optical film including the diffusion layer including the polymer matrix and the dispersed particles dispersed in the polymer matrix, the dispersed particles each containing the liquid crystal polymer that is the polymer of the polymerizable liquid crystal compound, the optical film including the plurality of regions exhibiting hazes different from each other in accordance with the alignment state of the liquid crystal polymer in plan view.

A-1. Configuration of Optical Film

Figure 1A:
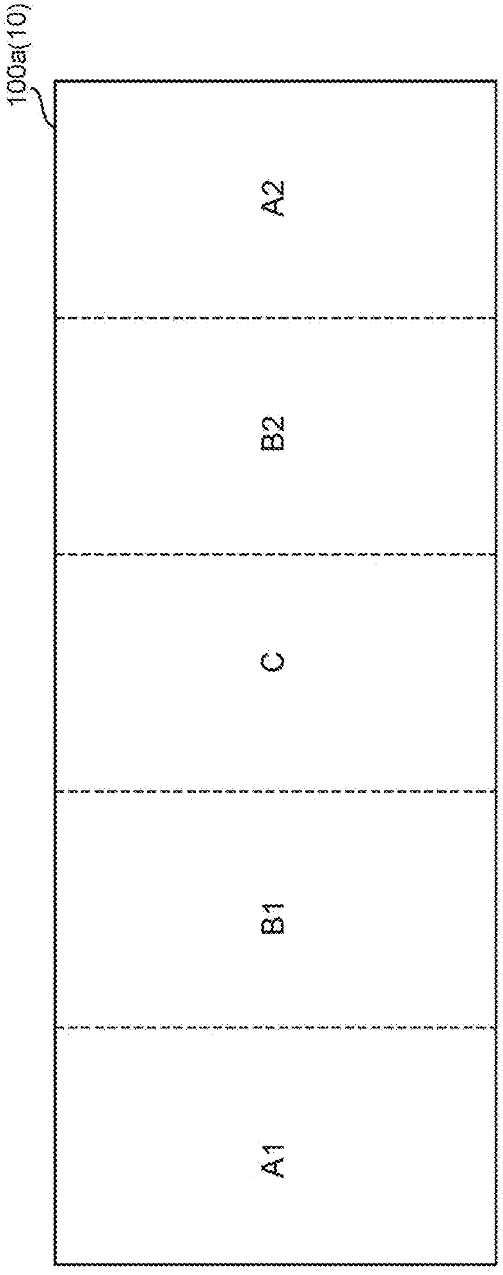
FIG. 1A is a schematic plan view of an example of an optical film according to one embodiment of the present invention.
Figure 1B:
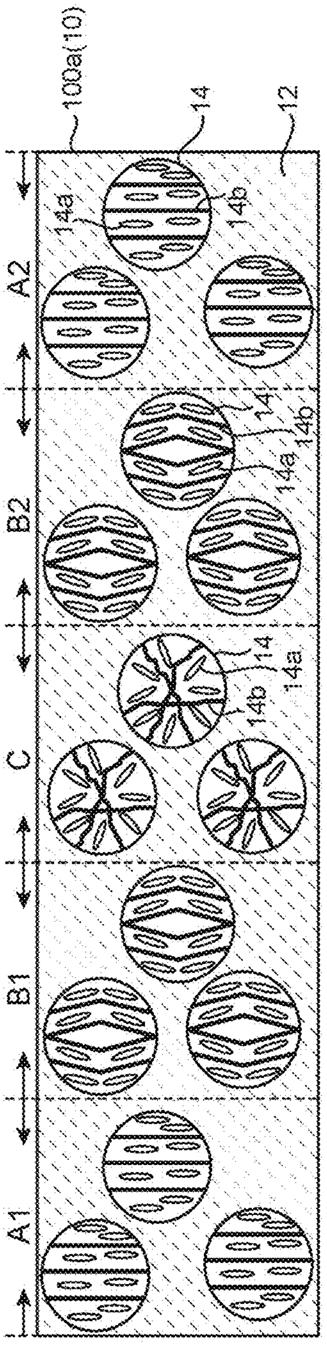
FIG. 1B is a schematic sectional view of the optical film illustrated in FIG. 1A.

FIG. 1A is a schematic plan view of an example of the optical film according to the first embodiment, and FIG. 1B is a schematic sectional view of the optical film of FIG. 1A. An optical film 100*a* is composed of a diffusion layer 10 including a polymer matrix 12 and dispersed particles 14 dispersed in the polymer matrix 12, the dispersed particles 14 each containing a liquid crystal compound 14*a* and a liquid crystal polymer 14*b*. The diffusion layer 10 includes five regions (A1, A2, B1, B2, and C). The alignment states of the liquid crystal polymer 14*b* in the regions A1 and A2 out of those regions are identical to each other, the alignment states of the liquid crystal polymer 14*b* in the regions B1 and B2 out of the regions are identical to each other, and the alignment states of the liquid crystal polymer 14*b* in the regions A1 and A2, the regions B1 and B2, and the region C are different from each other (relationship among the alignment states in the respective regions: A1=A2/B1≠B2≠C).

Specifically, the liquid crystal polymer 14*b* in each of the dispersed particles 14 is aligned substantially vertical to the main surface of the optical film 100*a* (diffusion layer 10) in each of the regions A1 and A2, is in a non-aligned state in the region c, and is in a middle alignment state therebetween in each of the regions B1 and B2. In addition, the liquid crystal compound 14*a* in each of the dispersed particles 14 is aligned along the liquid crystal polymer 14*b*, and is hence in the same alignment state as the alignment state of the liquid crystal polymer 14*b*. Accordingly, the dispersed particles in the plurality of regions (A1, A2, B1, B2, and C) may exhibit different scattering properties in the respective regions by virtue of differences in alignment state of the liquid crystal polymer and/or the liquid crystal compound. As a result, the optical film 100*a* exhibits the minimum haze (degree of diffusion) in each of parts corresponding to the regions A1 and A2, exhibits the maximum haze in a part corresponding to the region C, and exhibits a middle haze in each of parts corresponding to the regions B1 and B2 in plan view.

Figure 2:
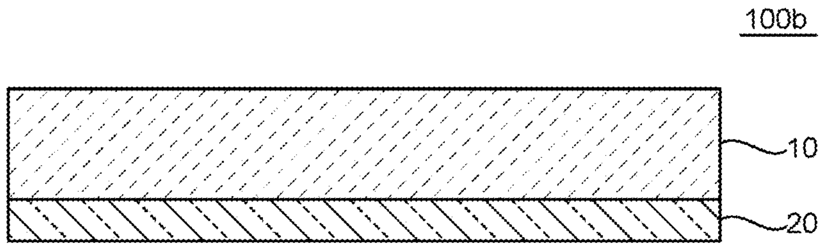
FIG. 2 is a schematic sectional view of an example of an optical film according to one embodiment of the present invention.
Figure 3:
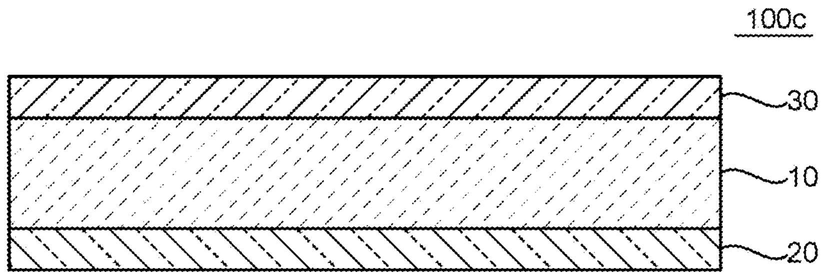
FIG. 3 is a schematic sectional view of an example of an optical film according to one embodiment of the present invention.

FIG. 2 and FIG. 3 are each a schematic sectional view of another example of the optical film according to the first embodiment (the dispersed particles are not shown). An optical film 100*b* illustrated in FIG. 2 includes a first transparent substrate 20 on the first main surface side of the diffusion layer 10. An optical film 100*c* illustrated in FIG. 3 includes: the first transparent substrate 20 on the first main surface side of the diffusion layer 10; and a second transparent substrate 30 on the second main surface side thereof. The diffusion layer 10 and each one or both of the first transparent substrate 20 and the second transparent substrate 30 may be laminated via an adhesive layer or a pressure-sensitive adhesive layer, or may be directly laminated without via any of those layers.

In the optical film 100*a* illustrated in FIGS. 1A and 1B, the dispersed particles 14 each contain the liquid crystal compound 14*a* and the liquid crystal polymer 14*b*, but the dispersed particles 14 may each be free of the liquid crystal compound 14*a*. In addition, in the optical film according to the embodiment of the present invention, the alignment of the liquid crystal compound in each of the dispersed particles may be controlled by the liquid crystal polymer, and hence the control of the alignment of the liquid crystal compound by the application of a voltage is not required to be performed. Accordingly, the optical film according to the embodiment of the present invention may be free of an electrode layer irrespective of whether the dispersed particles each contain the liquid crystal compound or not.

Although there are three patterns for the alignment state of the liquid crystal polymer in each of the dispersed particles in the diffusion layer of the embodiment illustrated in FIGS. 1A and 1B, the present invention is not limited to the embodiment. Specifically, the alignment state of the liquid crystal polymer is not particularly limited as long as there are two or more patterns therefor. In addition, the alignment states of the liquid crystal polymer in the plurality of regions different from each other in alignment state of the liquid crystal polymer (in other words, the scattering properties of the dispersed particles in the regions or the hazes of the regions) are not limited, and may each independently be a desired alignment state in each region. Further, the arrangement patterns of those regions are not limited, and may be freely designed as predetermined patterns. Accordingly, the optical film may exhibit a desired haze in a desired pattern.

In addition, in the embodiment illustrated in FIGS. 1A and 1B, although each of the plurality of regions (A1, A2, B1, B2, and C) different from each other in alignment state of the liquid crystal polymer in each of the dispersed particles has about a certain area, the region is not required to have an area having a predetermined value or more. For example, in the optical film of the first embodiment, even when the alignment state of the liquid crystal polymer continuously changes in an in-plane direction and a part in a specific alignment state cannot be specified as a region having a certain area in plan view, the following handling is performed: "the diffusion layer includes the plurality of regions different from each other in alignment state of the liquid crystal polymer." In one embodiment, when the haze of the optical film (more specifically, the diffusion layer) continuously changes in the in-plane direction in plan view, the alignment state of the liquid crystal polymer may be regarded as continuously changing in the in-plane direction.

When the optical film is seen in plan view, hazes in the parts corresponding to the plurality of regions different from each other in alignment state of the liquid crystal polymer in each of the dispersed particles may each be appropriately set in accordance with, for example, applications of the optical film. In one embodiment, a difference between the maximum value and minimum value of the hazes in the parts corresponding to the plurality of regions may be, for example, more than 0%, preferably 10% or more, more preferably from 20% to 100%, still more preferably from 30% to 100%. In addition, the maximum value of the hazes may be, for example, from 30% to 100%, and the minimum value of the hazes may be, for example, from 0% to 70%.

A-2. Diffusion Layer

The diffusion layer 10 includes the polymer matrix 12 and the dispersed particles 14 dispersed in the polymer matrix 12, the dispersed particles 14 each containing the liquid crystal polymer 14*b* that is the polymer of the polymerizable liquid crystal compound, and the diffusion layer 10 includes the plurality of regions different from each other in alignment state of the liquid crystal polymer 14*b* in each of the dispersed particles 14. The dispersed particles 14 may each further contain the liquid crystal compound 14*a*. For example, in the embodiment illustrated in FIGS. 1A and 1B, the dispersed particles 14 each contain the liquid crystal compound 14*a* and the liquid crystal polymer 14*b*. In addition, the diffusion layer 10 includes the regions A1, A2, B1, B2, and C, and the alignment states of the liquid crystal polymer 14*b* in the dispersed particles 14 of the respective regions are in the relationship of "A1=A2/B1≠B2≠C". That is, the alignment states of the liquid crystal polymer 14*b* in the regions A1 and A2, the regions B1 and B2, and the region C are different from each other. In addition, the liquid crystal compound 14*a* in each of the dispersed particles 14 is aligned along the liquid crystal polymer 14*b*. According to such configuration, the regions different from each other in alignment state of the liquid crystal polymer 14*b* in each of the dispersed particles 14 may exhibit hazes different from each other. Accordingly, the hazes of the respective regions of the diffusion layer 10 may satisfy the relationship of "A1=A2/B1≠B2≠C".

The haze in each of the plurality of regions of the diffusion layer may be appropriately set in accordance with, for example, applications of the optical film. The maximum value and minimum value of the hazes in the plurality of regions of the diffusion layer and the difference therebetween may be set so that the maximum value and minimum value of hazes desired for the optical film and a difference therebetween are obtained.

The polymer matrix 12 may be formed of any appropriate resin. A resin for forming the polymer matrix may be appropriately selected in accordance with, for example, a light transmittance, the refractive index of the liquid crystal compound, and adhesiveness to a substrate. For example, a water-soluble resin or a water-dispersible resin, such as a urethane-based resin, a polyvinyl alcohol-based resin, a polyethylene-based resin, a polypropylene-based resin, or an acrylic resin, may be preferably used. The resins for forming the polymer matrices may be used alone or in combination thereof.

The content ratio of the polymer matrix in the diffusion layer is, for example, from 30 wt % to 70 wt %, preferably from 35 wt % to 65 wt %, more preferably from 40 wt % to 60 wt %. When the content ratio of the polymer matrix falls within the ranges, for example, the following effects can be obtained: a satisfactory mechanical strength is obtained; and liquid crystal leakage from an end portion is prevented.

The liquid crystal polymer 14*b* is the polymer of the polymerizable liquid crystal compound, and is non-liquid crystalline. That is, the liquid crystal polymer does not undergo, for example, a transition into a liquid crystal phase, a glass phase, or a crystal phase caused by a temperature change, which is peculiar to a liquid crystalline compound.

The polymerizable liquid crystal compound for forming the liquid crystal polymer may be appropriately selected in accordance with, for example, a light transmittance and compatibility with a non-polymerizable liquid crystal compound to be described later. The polymerizable liquid crystal compound may be a cross-linkable compound that is difunctional or higher. For example, a polymerizable mesogenic compound and the like described in JP 2002-533742 A (WO 00/37585 A1), EP 358208 B1 (U.S. Pat. No. 5,211,877 A), EP 66137 B1 (U.S. Pat. No. 4,388,453 A), WO 93/22397 A1, EP 0261712 A1, DE 19504224 A1, DE 4408171 A1, GB 2280445 B, and the like may each be used as the polymerizable liquid crystal compound. A specific example of such polymerizable mesogenic compound is a product available under the product name "LC242" from BASF SE. For example, a nematic liquid crystal monomer is preferred as the polymerizable liquid crystal compound. The polymerizable liquid crystal compound has a birefringence Δn (=ne−no; ne represents the refractive index of a molecule of the liquid crystal compound in a major axis direction, and no represents the refractive index of the molecule of the liquid crystal compound in a minor axis direction) of preferably from 0.05 to 0.50, more preferably from 0.10 to 0.45 at a wavelength of 589 nm.

Any appropriate non-polymerizable liquid crystal compound may be used as the liquid crystal compound 14*a*. As described in detail in the section B, the diffusion layer may be formed by performing a polymerization reaction under a state in which the alignment of the polymerizable liquid crystal compound is controlled. At that time, by using the non-polymerizable liquid crystal compound in combination with the polymerizable liquid crystal compound, the temperature region of a liquid crystal phase (e.g., a nematic phase) is widened, and hence the control of the alignment can be more suitably performed. A non-polymerizable liquid crystal compound having a birefringence Δn (=ne−no; ne represents the refractive index of a molecule of the liquid crystal compound in a major axis direction, and no represents the refractive index of the molecule of the liquid crystal compound in a minor axis direction) of preferably from 0.05 to 0.50, more preferably a birefringence Δn of from 0.10 to 0.45 at a wavelength of 589 nm is used as the liquid crystal compound.

The dielectric anisotropy of the non-polymerizable liquid crystal compound may be positive or negative. The non-polymerizable liquid crystal compound may be, for example, a nematic, smectic, or cholesteric liquid crystal compound. The nematic liquid crystal compound is preferably used because excellent transparency in a transparent state can be achieved.

Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, a cholesterol-based compound, and a fluorine-based compound. Those low-molecular liquid crystal compounds may be used alone or in combination thereof.

The total content ratio of the liquid crystal polymer and the liquid crystal compound, when present, in the diffusion layer (when the liquid crystal compound is absent, the content ratio of the liquid crystal polymer) is, for example, from 30 wt % to 70 wt %, preferably from 35 wt % to 65 wt %, more preferably from 40 wt % to 60 wt %. In addition, the content ratio of the liquid crystal polymer with respect to the total content of the liquid crystal polymer and the liquid crystal compound in the diffusion layer (more specifically, the dispersed particles) may be, for example, 5 wt % or more, preferably 7 wt % or more, more preferably 10 wt % or more, and may be, for example, 100 wt % or less, preferably 80 wt % or less, more preferably 50 wt % or less. In addition, the total content ratio of the polymer matrix, the liquid crystal polymer, and the liquid crystal compound, when present, in the diffusion layer may be, for example, from 90 wt % to 99.9 wt %, preferably from 95 wt % to 99.9 wt %.

As described in detail in the section B, the diffusion layer may be formed by: producing a PDLC layer including liquid crystal droplets each containing the polymerizable liquid crystal compound and the non-polymerizable liquid crystal compound serving as an optional component; and polymerizing the polymerizable liquid crystal compound while applying a voltage from the first main surface side and second main surface side of the PDLC layer so as to generate regions different from each other in electric field intensity. Accordingly, the diffusion layer (more specifically, the dispersed particles) may further contain a polymerization initiator. The content ratio of the polymerization initiator is as described in the section B. In addition, an unreacted polymerizable liquid crystal compound may remain in the dispersed particles. The content ratio of the unreacted polymerizable liquid crystal compound in the diffusion layer (more specifically, the dispersed particles) is, for example, 3 wt % or less, preferably 1 wt % or less.

The average particle diameter of the dispersed particles may be, for example, from 0.3 μm to 9 μm, preferably from 0.4 μm to 8 μm. When the average particle diameter of the dispersed particles is too small, the sizes of the dispersed particles are each smaller than the wavelength of light, and hence the light is transmitted through the dispersed particles without being scattered. As a result, there may occur a problem in that a sufficient haze is not obtained. In addition, when the average particle diameter is too large, the sizes of the dispersed particles are each much larger than the wavelength of the light, and hence there may occur a problem in that a sufficient haze is not obtained. The average particle diameter of the dispersed particles in the diffusion layer is the volume-average particle diameter of the dispersed particles when the layer is viewed from a direction perpendicular to the main surface of the optical film.

The thickness of the diffusion layer is typically from 2 μm to 40 μm, preferably from 3 μm to 35 μm, more preferably from 4 μm to 30 μm.

A-3. First Transparent Substrate

The first transparent substrate 20 includes a first transparent film. The first transparent substrate may include a hard coat layer on one side, or each of both sides, of the first transparent film as required.

The haze of the first transparent substrate is preferably 20% or less, more preferably 10% or less, still more preferably from 0.1% to 10%.

The total light transmittance of the first transparent substrate is preferably 30% or more, more preferably 60% or more, still more preferably 80% or more. The total light transmittance may be measured in accordance with JIS K 7361.

The first transparent film may be formed by using any appropriate material. Specific examples thereof include a glass film and a polymer film. Of those, a polymer film is preferred because the polymer film is excellent in smoothness, and a significantly improvement in productivity can be achieved by continuous production with a roll.

The polymer film is typically a polymer film containing a thermoplastic resin as a main component. Examples of the thermoplastic resin include: a polyester-based resin; a cycloolefin-based resin such as polynorbornene; an acrylic resin; a polycarbonate resin; and a cellulose-based resin. Of those, a polyester-based resin, a cycloolefin-based resin, or an acrylic resin is preferred. Those resins are each excellent in transparency, mechanical strength, thermal stability, water barrier property, and the like. The thermoplastic resins may be used alone or in combination thereof. In addition, such an optical film as to be used in a polarizing plate, such as a low-retardation substrate, a high-retardation substrate, a retardation plate, an absorption-type polarizing film, or a polarization-selective reflective film, may be used as the first transparent substrate.

The total light transmittance of the first transparent film is preferably 30% or more, more preferably 60% or more, still more preferably 80% or more.

The thickness of the first transparent film is preferably 200 μm or less, more preferably from 3 μm to 150 μm, still more preferably from 5 μm to 100 μm.

A-4. Second Transparent Substrate

The second transparent substrate 30 includes a second transparent film. The second transparent substrate may include a hard coat layer on one side, or each of both sides, of the second transparent film as required.

The haze of the second transparent substrate is preferably 20% or less, more preferably 10% or less, still more preferably from 0.1% to 10%.

The total light transmittance of the second transparent substrate is preferably 30% or more, more preferably 60% or more, still more preferably 80% or more.

The same description as that of the first transparent film described in the section A-3 may be applied to the second transparent film. The second transparent substrate may have the same configuration as that of the first transparent substrate, or may have a configuration different therefrom.

A-5. Second Embodiment

According to a second embodiment of the present invention, there is provided a polymer film, including a diffusion layer including a polymer matrix and dispersed particles dispersed in the polymer matrix, the dispersed particles each containing a liquid crystal polymer that is a polymer of a polymerizable liquid crystal compound, wherein the diffusion layer includes a plurality of regions different from each other in content ratio of the liquid crystal polymer. Typically, the diffusion layer includes: a region including dispersed particles each containing the liquid crystal polymer; and a region including dispersed particles each containing the polymerizable liquid crystal compound. The content ratio of the liquid crystal polymer in the region including the dispersed particles each containing the polymerizable liquid crystal compound is smaller than the content ratio of the liquid crystal polymer in the region including the dispersed particles each containing the liquid crystal polymer. A difference in content ratio of the liquid crystal polymer is not limited as long as the effects of the present invention can be obtained. For example, the region including the dispersed particles each containing the polymerizable liquid crystal compound may be substantially free of the liquid crystal polymer. In such configuration, when the liquid crystal polymer and the polymerizable liquid crystal compound are in different alignment states, those regions may exhibit hazes different from each other.

When the optical film is seen in plan view, hazes in parts corresponding to the plurality of regions different from each other in content ratio of the liquid crystal polymer may each be appropriately set in accordance with, for example, applications of the optical film. In one embodiment, a difference between the maximum value and minimum value of the hazes in the parts corresponding to the plurality of regions may be, for example, more than 0%, preferably 10% or more, more preferably from 20% to 100%, still more preferably from 30% to 100%. In addition, the maximum value of the hazes may be, for example, from 30% to 100%, and the minimum value of the hazes may be, for example, from 0% to 70%.

Figure 4:
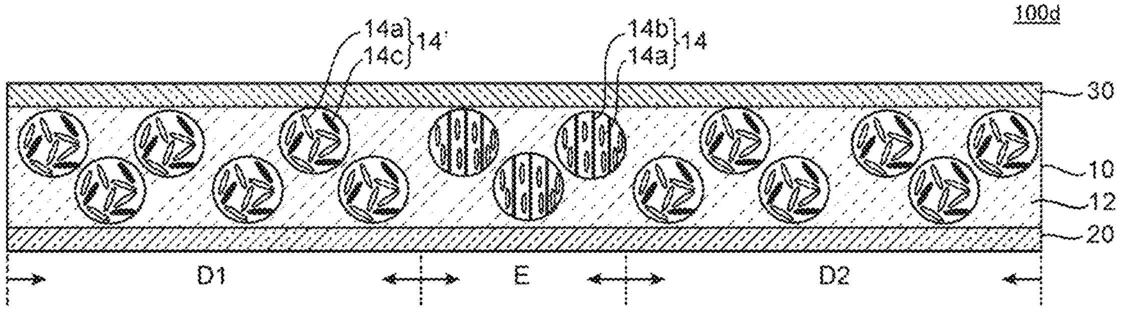
FIG. 4 is a schematic sectional view of an example of an optical film according to another embodiment of the present invention.

FIG. 4 is a schematic sectional view of an example of the optical film according to the second embodiment of the present invention. An optical film 100*d* includes: the diffusion layer 10; the first transparent substrate 20 arranged on the first main surface side of the diffusion layer 10; and the second transparent substrate 30 arranged on the second main surface side thereof. The diffusion layer 10 includes: a region E including the polymer matrix 12 and first dispersed particles 14 dispersed in the polymer matrix 12, the first dispersed particles 14 each containing a non-polymerizable liquid crystal compound 14*a* and the liquid crystal polymer 14*b*; and regions D1 and D2 each including the polymer matrix 12 and second dispersed particles 14' dispersed in the polymer matrix 12, the second dispersed particles 14' each containing the non-polymerizable liquid crystal compound 14*a* and a polymerizable liquid crystal compound 14*c*. The second dispersed particles 14' may be droplets of the liquid crystal compound. In the region E, the non-polymerizable liquid crystal compound 14*a* and the liquid crystal polymer 14*b* are aligned substantially perpendicularly to the main surface. In each of the regions D1 and D2, the non-polymerizable liquid crystal compound 14*a* and the polymerizable liquid crystal compound 14*c* are each in a non-aligned state. Accordingly, each of the regions D1 and D2 may exhibit a haze higher than the region E in plan view.

With regard to the diffusion layer 10, the same descriptions as those in the section A-2 may be applied to the regions including the first dispersed particles 14. The same descriptions as those in the section A-2 may be applied to the regions including the second dispersed particles 14' except that the dispersed particles each contain the polymerizable liquid crystal compound 14*c* instead of the liquid crystal polymer 14*b*. The dispersed particles 14' may each be free of the non-polymerizable liquid crystal compound 14*a* in accordance with purposes in the same manner as in the dispersed particles 14.

The same descriptions as those in the sections A-3 and A-4 may be applied to the first transparent substrate 20 and the second transparent substrate 30, respectively. Any one or both of the first transparent substrate 20 and the second transparent substrate 30 may be omitted in accordance with purposes.

A-6. Applications of Optical Film

The optical film according to the embodiment of the present invention may exhibit a desired haze in a desired pattern. Accordingly, specific examples of the applications of the optical film include a diffusion film and a designed film.

A preferred example of the diffusion film is a diffusion film for an image display apparatus, more specifically, a diffusion film for an image display apparatus including a direct backlight. Specifically, uniformization of an in-plane brightness distribution may be suitably performed by applying, to a direct backlight including a plurality of LED light sources arranged at predetermined intervals, an optical film patterned so that the haze of a region positioned just above the LED light sources is high and the haze reduces as a distance from the LED light sources increases.

A preferred example of the designed film is a shielding film for shielding wiring or the like arranged on the peripheral edge portion of an image display region in an image display apparatus, such as a liquid crystal display apparatus or an organic EL display apparatus. In general, the shielding of the wiring or the like is performed by arranging, directly or via a substrate film, a printing layer having a frame shape on a front surface plate, such as a cover glass or a cover film. While there is a problem in that air bubbles may occur because, according to such configuration, an interlayer pressure-sensitive adhesive cannot sufficiently absorb a difference in thickness between a portion in which the printing layer is arranged and any other portion, the optical film according to the embodiment of the present invention can eliminate the problem of air bubbles because there is no step between a shielded region (high-haze region) and a display region (low-haze region), and hence the optical film is smooth.

B. Method of Producing Optical Film

A method of producing an optical film according to a first embodiment of the present invention includes:

(step A) applying, to a first substrate, an application liquid containing a resin for forming a polymer matrix, a polymerizable liquid crystal compound, and a solvent to provide an applied layer;

(step B) drying the applied layer to provide a PDLC layer including a polymer matrix and droplets dispersed in the polymer matrix, the droplets each containing the polymerizable liquid crystal compound; and (step C) polymerizing the polymerizable liquid crystal compound while applying a voltage from the first main surface side and second main surface side of the PDLC layer so as to generate regions different from each other in electric field intensity.

The method of producing an optical film according to the first embodiment may further include arranging a second substrate on the side of the PDLC layer or the diffusion layer opposite to the side on which the first substrate is arranged (step D) before or after polymerizing the polymerizable liquid crystal compound as required. According to the method of producing the optical film of the first embodiment, the polymerizable liquid crystal compound is polymerized in different alignment states in accordance with electric field intensities in the respective regions different from each other in electric field intensity. As a result, the diffusion layer including a plurality of regions different from each other in alignment state of the liquid crystal polymer in each of the dispersed particles may be formed. Consequently, according to the method of producing an optical film of the first embodiment, the optical film described in the section A (specifically, the optical film of the first embodiment) can be suitably obtained.

B-1. Step A

The step A includes applying, to a first substrate, an application liquid containing a resin for forming a polymer matrix, a polymerizable liquid crystal compound, and a solvent to provide an applied layer. The application liquid may contain a non-polymerizable liquid crystal compound.

The application liquid is preferably an emulsion (hereinafter sometimes referred to as "emulsion application liquid") containing, as a dispersoid, liquid crystal particles each containing the polymerizable liquid crystal compound and optionally the non-polymerizable liquid crystal compound. In one embodiment, the application liquid is an emulsion application liquid in which resin particles for forming a polymer matrix and the liquid crystal particles each containing the polymerizable liquid crystal compound and optionally the non-polymerizable liquid crystal compound are dispersed in the solvent. The emulsion application liquid preferably further contains a polymerization initiator in each of the liquid crystal particles, and may further contain any appropriate additive in accordance with purposes.

Water or a mixed solvent of water and a water-miscible organic solvent may be preferably used as the solvent. Examples of the water-miscible organic solvent include C1 to C3 alcohols, acetone, and DMSO. The polymerizable liquid crystal compound, the non-polymerizable liquid crystal compound, and the resin for forming a polymer matrix are as described in the section A-2. Examples of the any appropriate additive include a dispersant, a leveling agent, and a cross-linking agent.

The content ratio of the liquid crystal compound (total content ratio of the polymerizable liquid crystal compound and the non-polymerizable liquid crystal compound, when present), in the solid content of the application liquid may be, for example, from 30 wt % to 70 wt %, preferably from 35 wt % to 65 wt %, more preferably from 40 wt % to 60 wt %.

A content weight ratio between the polymerizable liquid crystal compound and the non-polymerizable liquid crystal compound (polymerizable liquid crystal compound: non-polymerizable liquid crystal compound) in the application liquid may be, for example, from 5:95 to 100:0, preferably from 7:93 to 80:20, more preferably from 10:90 to 50:50.

The content ratio of the resin for forming a polymer matrix in the solid content of the application liquid may be, for example, from 30 wt % to 70 wt %, preferably from 35 wt % to 65 wt %, more preferably from 40 wt % to 60 wt %.

A weight ratio between the content of the liquid crystal compound (total content of the polymerizable liquid crystal compound and the non-polymerizable liquid crystal compound, when present) and the content of the resin for forming a polymer matrix (liquid crystal compounds: resin for forming a polymer matrix) in the application liquid may be, for example, from 30:70 to 70:30, preferably from 35:65 to 65:35, more preferably from 40:60 to 60:40. In addition, the total content ratio of the resin for forming a polymer matrix, the polymerizable liquid crystal compound, and the non-polymerizable liquid crystal compound, when present, in the solid content of the application liquid may be, for example, from 90 wt % to 99.9 wt %, preferably from 95 wt % to 99.9 wt %.

The average particle diameter of the liquid crystal particles is preferably 0.3 μm or more, more preferably 0.4 μm or more. In addition, the average particle diameter of the liquid crystal particles is preferably 9 μm or less, more preferably 8 μm or less. When the average particle diameter of the liquid crystal particles falls within the ranges, the average particle diameter of the dispersed particles in the diffusion layer can be set within a desired range. The average particle diameter of the liquid crystal particles is a volume-average particle diameter.

The average particle diameter of the liquid crystal particles preferably has a relatively narrow particle size distribution. The coefficient of variation (CV value) of the average particle diameter of the liquid crystal particles may be, for example, less than 0.40, and may be preferably 0.35 or less, more preferably 0.30 or less. In one embodiment, an emulsion application liquid substantially free of any liquid crystal particles each having a particle diameter of less than 0.3 μm or more than 9 μm (e.g., an emulsion application liquid in which the ratio of the volume of liquid crystal particles each having a particle diameter of less than 0.3 μm or more than 9 μm to the total volume of the liquid crystal particles is 10% or less) may be used.

The average particle diameter of the resin particles for forming a polymer matrix is preferably from 10 nm to 500 nm, more preferably from 30 nm to 300 nm, still more preferably from 50 nm to 200 nm. Two or more kinds of resin particles containing different kinds of resins and/or having different average particle diameters may be used. The average particle diameter of the resin particles for forming a polymer matrix means a volume-average median diameter, and may be measured with a dynamic light scattering-type particle size distribution-measuring apparatus.

Any appropriate photopolymerization initiator or thermal polymerization initiator may be used as the polymerization initiator initiator in accordance with, for example, purposes and desired characteristics, and a photopolymerization initiator is preferably used. Specific examples of the photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N, N,N',N'-tetramethyl-4,4'-diaminobenzophenone, 1-(4-isopropylphenyl)-2-hydroxy-2-methylpropan-1-one, 2,4,6-trimethylbenzoyldiphenylphosphine oxide, bis-(2,4,6-trimethylbenzoyl)-phenylphosphine oxide, bis(2,4,6-trimethylbenzoyl)-2,4-dipentoxyphenylphosphine oxide, bis(2,6-dimethoxy-benzoyl)-(2,4,4-trimethyl-pentyl)-phosphine oxide, and a thioxanthone-based compound. The polymerization initiators may be used alone or in combination thereof. The content ratio of the polymerization initiator is preferably from 0.1 part by weight to 10 parts by weight, more preferably from 0.5 part by weight to 5 parts by weight with respect to 100 parts by weight of the polymerizable liquid crystal compound.

Examples of the dispersant may include an anionic surfactant, a cationic surfactant, an amphoteric surfactant, and a nonionic surfactant. The content ratio of the dispersant is preferably from 0.05 part by weight to 10 parts by weight, more preferably from 0.1 part by weight to 1 part by weight with respect to 100 parts by weight of the emulsion application liquid.

Examples of the leveling agent may include an acrylic leveling agent, a fluorine-based leveling agent, and a silicone-based leveling agent. The content ratio of the leveling agent is preferably from 0.05 part by weight to 10 parts by weight, more preferably from 0.1 part by weight to 1 part by weight with respect to 100 parts by weight of the emulsion application liquid.

Examples of the cross-linking agent may include an aziridine-based cross-linking agent and an isocyanate-based cross-linking agent. The content ratio of the cross-linking agent is preferably from 0.5 part by weight to 10 parts by weight, more preferably from 0.8 part by weight to 5 parts by weight with respect to 100 parts by weight of the emulsion application liquid.

The emulsion application liquid may be prepared by, for example, mixing a resin emulsion or a resin particle dispersion containing resin particles for forming a polymer matrix, a liquid crystal emulsion containing liquid crystal particles each containing a polymerizable liquid crystal compound, a polymerization initiator, and optionally a non-polymerizable liquid crystal compound, and any appropriate additive (e.g., a dispersant, a leveling agent, or a cross-linking agent). A solvent may be further added at the time of the mixing as required. Alternatively, the emulsion application liquid may also be prepared by, for example, adding a polymerizable liquid crystal compound, a resin for forming a polymer matrix, a polymerization initiator, and optionally a non-polymerizable liquid crystal compound and an additive to a solvent, and mechanically dispersing the materials in the solvent.

The resin emulsion and the liquid crystal emulsion may each be prepared by, for example, a mechanical emulsification method, a microchannel method, or a membrane emulsification method. The liquid crystal emulsion is preferably prepared by the membrane emulsification method out of those methods. According to the membrane emulsification method, an emulsion having a uniform particle size distribution may be suitably obtained. Reference may be made to the disclosures of, for example, JP 04-355719 A and JP 2015-40994 A, which are incorporated herein by reference, for details about the membrane emulsification method.

The solid content concentration of the emulsion application liquid may be, for example, from 20 wt % to 60 wt %, preferably from 30 wt % to 50 wt %.

The viscosity of the emulsion application liquid may be appropriately adjusted so that its application to the first substrate is suitably performed. The viscosity of the emulsion application liquid at the time of the application is preferably from 20 mPa·s to 400 mPa·s, more preferably from 30 mPa·s to 300 mPa·s, still more preferably from 40 mPa·s to 200 mPa·s. When the viscosity is less than 20 mPa·s, the convection of the solvent may become remarkable at the time of the drying of the solvent to destabilize the thickness of the PDLC layer (as a result, the diffusion layer). In addition, when the viscosity is more than 400 mPa·s, the beads of the emulsion application liquid may not be stable. The viscosity of the emulsion application liquid may be measured with, for example, a rheometer MCR 302 manufactured by Anton Paar GmbH. The value of a shear viscosity under the conditions of 20° C. and a shear rate of 1,000 (1/s) is used as the viscosity in this case.

Any appropriate substrate may be used as the first substrate. An optical film including the first transparent substrate and the diffusion layer can be suitably obtained by using the first transparent substrate described in the section A-3 as the first substrate. The first substrate may be removed by being peeled from the diffusion layer after the completion of the step C in accordance with purposes.

Any appropriate method may be adopted as a method for the application. Examples thereof include a roll coating method, a spin coating method, a wire bar coating method, a dip coating method, a die coating method, a curtain coating method, a spray coating method, and a knife coating method (e.g., a comma coating method). Of those, a roll coating method is preferred. For example, reference may be made to the description of JP 2019-5698 A for the application by the roll coating method with a slot die.

The thickness of the applied layer is preferably from 3 μm to 40 μm, more preferably from 4 μm to 30 μm, still more preferably from 5 μm to 20 μm. When the thickness falls within such ranges, a PDLC layer (as a result, the diffusion layer) excellent in thickness uniformity can be obtained.

B-2. Step B

The step B includes drying the applied layer to provide a PDLC layer including a polymer matrix and droplets dispersed in the polymer matrix, the droplets each containing the polymerizable liquid crystal compound and optionally the non-polymerizable liquid crystal compound. The solvent is removed from the applied layer through the drying, and the resin particles for forming a polymer matrix are thus fused to each other. Thus, the PDLC layer having a structure in which the liquid crystal droplets are dispersed in the polymer matrix is formed.

The drying of the applied layer may be performed by any appropriate method. Specific examples of the drying method include natural drying, heat drying, and hot-air drying. When the emulsion application liquid contains a cross-linking agent, the cross-linked structure of the polymer matrix may be formed at the time of the drying.

A drying temperature is preferably from 20° C. to 150° C., more preferably from 25° C. to 80° C. A drying time is preferably from 1 minute to 100 minutes, more preferably from 2 minutes to 10 minutes.

B-3. Step C

The step C includes polymerizing the polymerizable liquid crystal compound while applying a voltage from the first main surface side and second main surface side of the PDLC layer so as to generate regions different from each other in electric field intensity. Thus, the diffusion layer including the polymer matrix and dispersed particles dispersed in the polymer matrix, the dispersed particles each containing a liquid crystal polymer that is a polymer of a polymerizable liquid crystal compound, is formed.

The polymerization of the polymerizable liquid crystal compound is performed by irradiation with an active energy ray, heating, or combination thereof, and is preferably performed by irradiation with an active energy ray.

For example, UV light, infrared light, an X-ray, an α-ray, a β-ray, a γ-ray, or an electron beam is used as the active energy ray. Of those, UV light is preferred. In addition, the active energy ray is preferably collimated light having high straightness from an irradiation source.

UV irradiation conditions may be appropriately set in accordance with, for example, the kind of the polymerizable liquid crystal compound, the transmittance of the substrate, and the absorption wavelength of the photopolymerization initiator. An irradiation intensity may be, for example, from 0.1 $mW/cm^2$ to 1,000 $mW/cm^2$, preferably from 1 $mW/cm^2$ to 100 $mW/cm^2$. An irradiation amount may be, for example, from 10 $mJ/cm^2$ to 10,000 $mJ/cm^2$, preferably from 100 $mJ/cm^2$ to 5,000 $mJ/cm^2$. An irradiation temperature may be, for example, from −20° C. to 80° C., preferably from −20° C. to 60° C.

In one embodiment, the application of the voltage is performed by using a first electrode arranged on the first main surface side of the PDLC layer and a second electrode arranged on the second main surface side thereof, and the regions different from each other in electric field intensity are formed by controlling a separation distance between the first electrode and the second electrode. The step C is described below with reference to FIGS. 5A to 5C. In an embodiment illustrated in FIGS. 5A to 5C, the step D is performed before the step C, and the first transparent substrate 20 serving as a first substrate is arranged on the first main surface side of a PDLC layer 10*a* and the second transparent substrate 30 serving as a second substrate is arranged on the second main surface side thereof. Unlike the illustrated example, a state in which the first main surface and/or second main surface of the PDLC layer is exposed may be adopted.

Figure 5A:
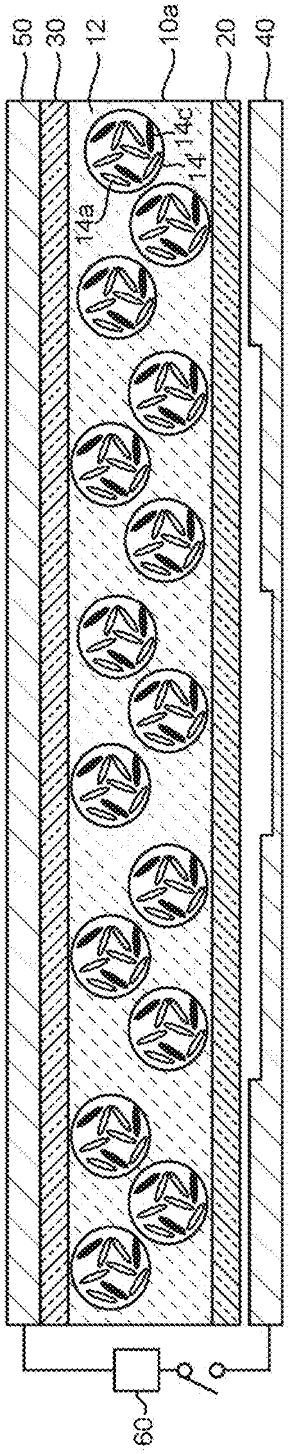
FIGS. 5A to 5C are schematic views for illustrating a step C of a method of producing an optical film according to one embodiment of the present invention.

FIG. 5A is a schematic sectional view for illustrating the PDLC layer obtained in the step B in a state in which a voltage is not applied. The PDLC layer 10*a* includes the polymer matrix 12 and the liquid crystal droplets 14' dispersed in the polymer matrix 12, the liquid crystal droplets 14' each containing the non-polymerizable liquid crystal compound 14*a* and the polymerizable liquid crystal compound 14*c*. A first electrode 40 is arranged on the outer side (side opposite to the side on which the PDLC layer is arranged) of the first transparent substrate 20, and a second electrode 50 that can transmit an active energy ray is arranged on the outer side (side opposite to the side on which the PDLC layer is arranged) of the second transparent substrate 30. No voltage is applied to the electrodes 40 and 50 from a power source 60 and no electric field occurs between the electrodes, and hence the non-polymerizable liquid crystal compound 14*a* and the polymerizable liquid crystal compound 14*c* in each of the liquid crystal droplets 14' are each present in a non-aligned state. In addition, the first electrode 40 is formed so that the surface heights on the PDLC layer 10*a* side differ from each other depending on parts. Thus, regions different from each other in interelectrode distance are formed.

Figure 6:
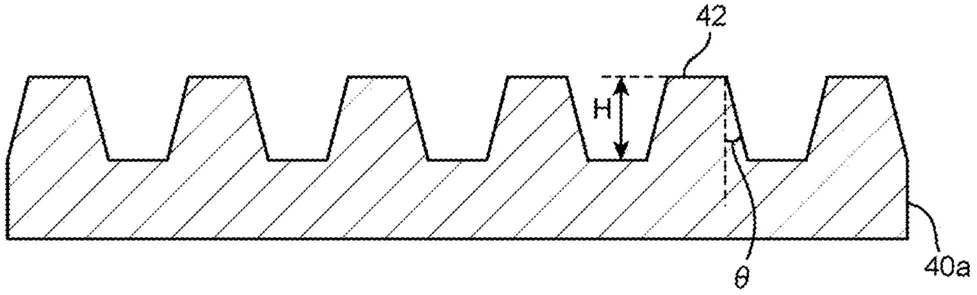
FIG. 6 is a schematic sectional view for illustrating an electrode having a protrusion.

The regions different from each other in interelectrode distance may each be freely designed by, for example, changing the surface shape of each of the first electrode and/or the second electrode on its PDLC layer side. Specifically, a desired interelectrode distance can be achieved in a desired pattern by arranging, for example, unevenness, a step, or inclination on the surface of the first electrode and/or the second electrode in any appropriate pattern. For example, as illustrated in FIG. 6, the interelectrode distance may be continuously changed by arranging a tapered protrusion 42 on the surface of an electrode 40*a*, and as a result, the alignment states of the polymerizable liquid crystal compound and the non-polymerizable liquid crystal compound in the liquid crystal droplets may be continuously changed in the plane. At this time, by changing a height H and an inclination angle θ, the amount of change in inter-electrode distance and a change ratio thereof may be controlled, and as a result, the optical film to be obtained can have a haze having a gradient of any appropriate variety. The height H and the inclination angle θ may each be set to any appropriate value in accordance with the pattern of a haze desired for the optical film.

Figure 5B:
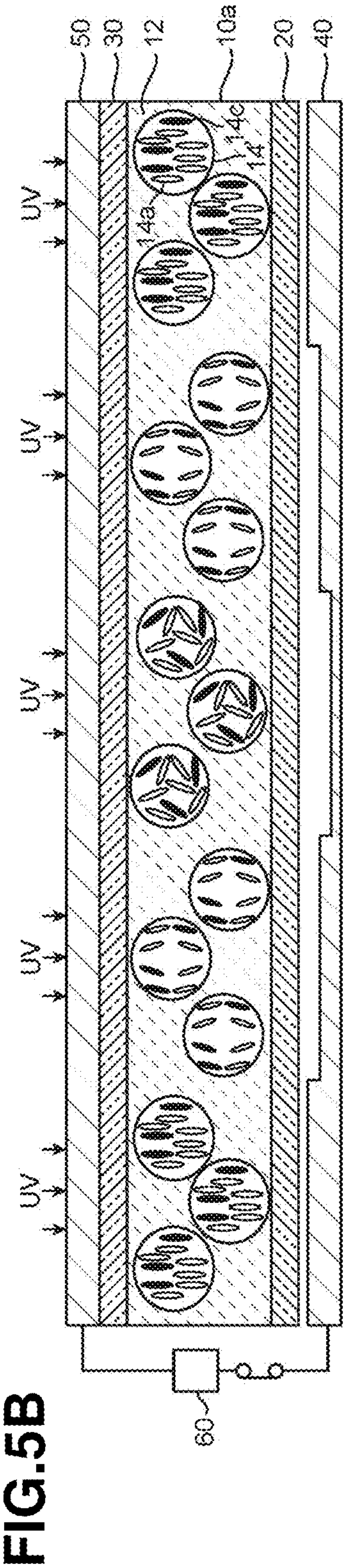
Figure 5C:
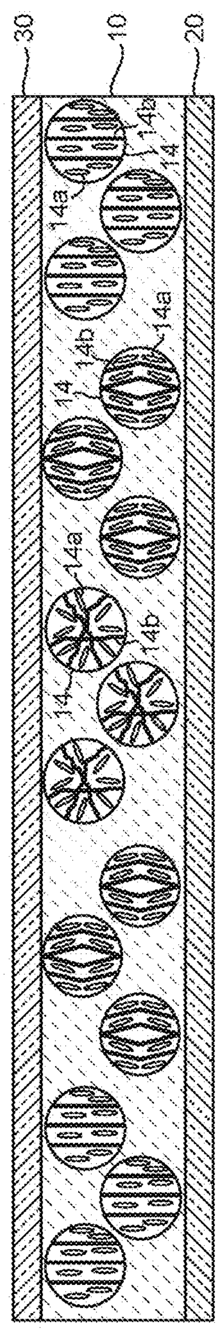

FIG. 5B is a schematic view for illustrating an embodiment of polymerizing the polymerizable liquid crystal compound 14*c* by UV irradiation. The UV irradiation is performed under a state in which a voltage is applied between the first electrode 40 and the second electrode 50 from the power source 60. When the voltage is applied, an electric field having an intensity in accordance with the separation distance between the first electrode 40 and the second electrode 50 occurs therebetween, and as a result, a plurality of regions different from each other in electric field intensity are generated. In each of the plurality of regions, the non-polymerizable liquid crystal compound 14*a* and the polymerizable liquid crystal compound 14*c* in each of the liquid crystal droplets 14' are aligned in accordance with the electric field intensity. Specifically, in a region in which the separation distance between the first electrode 40 and the second electrode 50 is the smallest, the non-polymerizable liquid crystal compound 14*a* and the polymerizable liquid crystal compound 14*c* are aligned substantially perpendicularly to the main surface of the PDLC layer 10*a*, and the degree of alignment decreases as the separation distance increases. When the polymerizable liquid crystal compound 14*c* is polymerized under such state, as illustrated in FIG. 5C, the diffusion layer 10 including a plurality of regions different from each other in alignment state of the liquid crystal polymer 14*b* in each of the dispersed particles 14 is formed.

The voltage to be applied at the time of the polymerization is not limited as long as the polymerizable liquid crystal compound shows a desired alignment, and may be appropriately set in accordance with, for example, the haze desired for the optical film or the separation distance between the electrodes. The voltage may be, for example, from 10 V to 100 kV, preferably from 100 V to 10 kV.

B-4. Step D

The step D includes arranging the second substrate on the side (second main surface side) of the PDLC layer or the diffusion layer opposite to the side (first main surface side) thereof on which the first substrate is arranged. Any appropriate substrate may be used as the first substrate, the second transparent substrate described in the section A-4 may be preferably used. The timing at which the step D is performed may be before the step C, that is, before polymerizing the polymerizable liquid crystal compound, or may be after the step C, that is, after polymerizing the polymerizable liquid crystal compound.

According to the method of producing an optical film including the step D, an optical film including a first transparent substrate, a second transparent substrate, and a diffusion layer directly sandwiched therebetween can be obtained by using the first transparent substrate described in the section A-3 and the second transparent substrate described in the section A-4 as the first substrate and the second substrate, respectively.

From the viewpoint of obtaining sufficient adhesiveness, the second substrate is laminated on the second main surface side of the PDLC layer or the diffusion layer while preferably a lamination pressure of from 0.006 MPa/m to 7 MPa/m, more preferably a lamination pressure of from 0.06 MPa/m to 0.7 MPa/m is applied with a laminator.

A method of producing an optical film according to a second embodiment of the present invention includes:

(step I) applying, to a first substrate, an application liquid containing a resin for forming a polymer matrix, a polymerizable liquid crystal compound, and a solvent to provide an applied layer;

(step II) drying the applied layer to provide a polymer dispersed liquid crystal layer including a polymer matrix and droplets dispersed in the polymer matrix, the droplets each containing the polymerizable liquid crystal compound; and (step III) irradiating a predetermined region with an active energy ray under a state in which a voltage is applied to the polymer dispersed liquid crystal layer to polymerize the polymerizable liquid crystal compound.

The method of producing an optical film according to the second embodiment may further include arranging a second substrate on the side of the PDLC layer or the diffusion layer opposite to the side on which the first substrate is arranged (step IV) before or after polymerizing the polymerizable liquid crystal compound as required. According to the method of producing an optical film of the second embodiment, in a region irradiated with the active energy ray, the polymerizable liquid crystal compound is polymerized in an aligned state, and hence a liquid crystal polymer having a fixed alignment state is produced. Meanwhile, in a region prevented from being irradiated with the active energy ray, the polymerizable liquid crystal compound is not polymerized, and hence a non-aligned state is established under a state in which no voltage is applied. As a result, a diffusion layer including a plurality of regions different from each other in content ratio of the liquid crystal polymer is formed, and the haze of a region having a large content ratio of the liquid crystal polymer (irradiated region) is smaller than the haze of a region having a small content ratio thereof (non-irradiated region). According to the method of producing an optical film of the second embodiment, the optical film described in the section A (e.g., the optical film of the second embodiment) can be suitably obtained. In addition, according to the method of producing an optical film of the second embodiment, the boundary between the irradiated region and the non-irradiated region is clear, and hence an optical film having a high contrast of the hazes between those regions can be suitably obtained.

The same descriptions as those of the step A, the step B, and the step D in the method of producing an optical film according to the first embodiment may be applied to the step I, the step II, and the step IV, respectively. However, the photopolymerization initiator is used as the polymerization initiator.

The step III includes irradiating a predetermined region with an active energy ray to polymerize the polymerizable liquid crystal compound under a state in which a voltage is applied to the PDLC layer. The irradiation with the active energy ray is typically performed through a photomask including an opening portion having a predetermined pattern.

For example, UV light, infrared light, an X-ray, an α-ray, a β-ray, a γ-ray, or an electron beam is used as the active energy ray. Of those, UV light is preferred. In addition, the active energy ray is preferably collimated light having high straightness from an irradiation source. UV irradiation conditions may be the same as the conditions described in the method of producing an optical film according to the first embodiment.

Figure 7A:
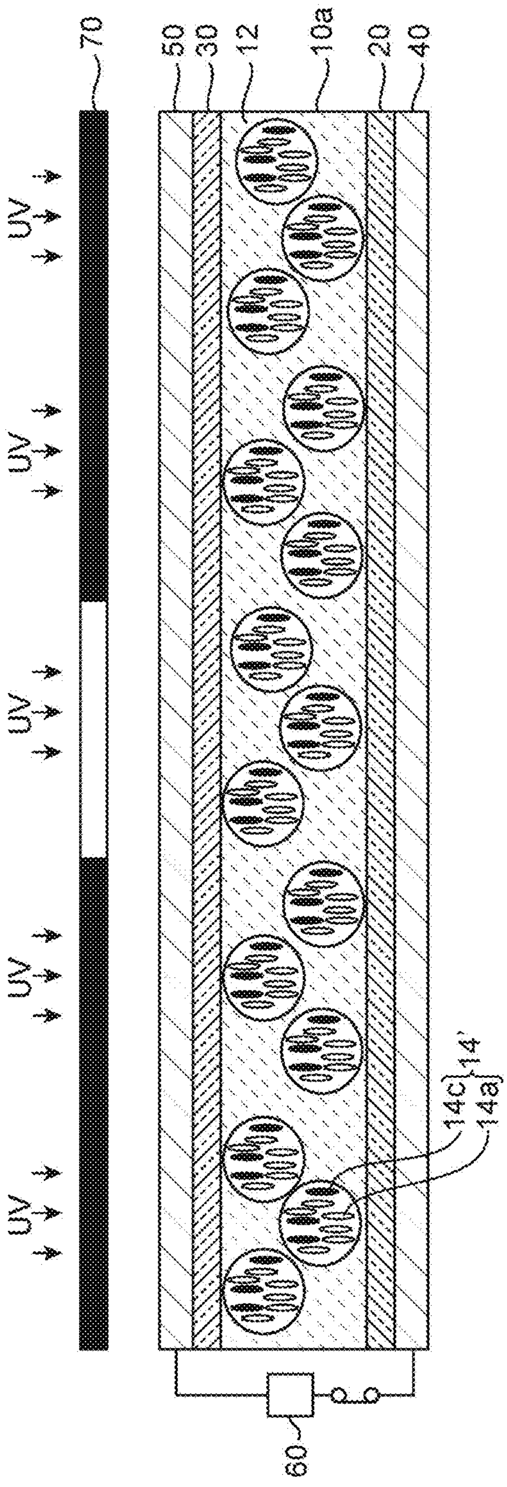
FIGS. 7A and 7B are schematic views for illustrating a step III of a method of producing an optical film according to another embodiment of the present invention.
Figure 7B:
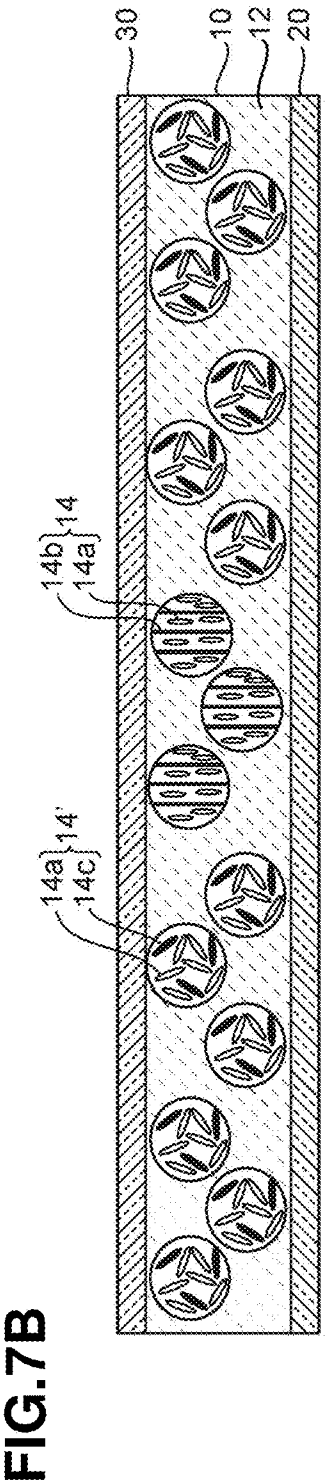

FIGS. 7A and 7B are schematic views for illustrating one embodiment of the step III. In the embodiment illustrated in FIGS. 7A and 7B, the step IV is performed before the step III, the first transparent substrate 20 serving as a first substrate is arranged on the first main surface side of the PDLC layer 10*a*, and the second transparent substrate 30 serving as a second substrate is arranged on the second main surface side thereof. Unlike the illustrated example, the state in which the first main surface and/or second main surface of the PDLC layer is exposed may be adopted.

The PDLC layer 10*a* includes the polymer matrix 12 and the liquid crystal droplets 14' dispersed in the polymer matrix 12, the liquid crystal droplets 14' each containing the non-polymerizable liquid crystal compound 14*a* and the polymerizable liquid crystal compound 14*c*. The first electrode 40 is arranged on the outer side (side opposite to the side on which the PDLC layer is arranged) of the first transparent substrate 20, and the second electrode 50 that can transmit an active energy ray is arranged on the outer side (side opposite to the side on which the PDLC layer is arranged) of the second transparent substrate 30.

FIG. 7A, a voltage is applied to the electrodes 40 and 50 from the power source 60, and hence an electric field occurs therebetween. Accordingly, the non-polymerizable liquid crystal compound 14*a* and the polymerizable liquid crystal compound 14*c* in each of the liquid crystal droplets 14' are aligned in a substantially perpendicular direction. The alignment states of the non-polymerizable liquid crystal compound 14*a* and the polymerizable liquid crystal compound 14*c* are preferably uniform over the entirety of the PDLC layer. Under such state, the irradiation with the active energy ray (in the illustrated example, UV light) is performed through a photomask 70 including an opening portion having a predetermined pattern. Thus, the polymerizable liquid crystal compound 14*c* in the irradiated region is polymerized to produce the liquid crystal polymer 14*b*.

As illustrated in FIG. 7B, after the irradiation with the active energy ray, the irradiated region of the diffusion layer 10 includes the first dispersed particles 14 containing the non-polymerizable liquid crystal compound 14*a* and the liquid crystal polymer 14*b*, and the non-irradiated region thereof includes the second dispersed particles (liquid crystal droplets) 14' containing the non-polymerizable liquid crystal compound 14*a* and the polymerizable liquid crystal compound 14*c*. In the first dispersed particles 14, the alignment state of the liquid crystal polymer 14*b* is fixed, and the non-polymerizable liquid crystal compound 14*a* is aligned along the liquid crystal polymer 14*b*. In this embodiment, the irradiated region may exhibit a haze lower than that of the non-irradiated region.

The voltage to be applied at the time of the polymerization is not limited as long as the polymerizable liquid crystal compound shows a desired alignment, and may be appropriately set in accordance with, for example, the haze desired for the optical film or the separation distance between the electrodes. The voltage may be, for example, from 10 V to 100 kV, preferably from 100 V to 10 kV.

The non-irradiated region may be irradiated with the active energy ray under a no voltage applied state after the step III as required. Thus, the liquid crystal polymer may be produced by polymerizing the polymerizable liquid crystal compound in the non-irradiated region under a non-aligned state.

Alternatively, in the step III, the polymerization of the polymerizable liquid crystal compound may be performed through the photomask under a no voltage applied state, and after that, the non-irradiated region may be irradiated with the active energy ray in a voltage applied state. That is, a method of producing an optical film of a third embodiment of the present invention includes:

(step I) applying, to a first substrate, an application liquid containing a resin for forming a polymer matrix, a polymerizable liquid crystal compound, and a solvent to provide an applied layer;

(step II) drying the applied layer to provide a polymer dispersed liquid crystal layer including a polymer matrix and droplets dispersed in the polymer matrix, the droplets each containing the polymerizable liquid crystal compound;

(step IIIα) irradiating a predetermined region with an active energy ray to polymerize the polymerizable liquid crystal compound under a state in which no voltage is applied to the polymer dispersed liquid crystal layer; and (step IIIβ) irradiating the rest of the region with an active energy ray to polymerize the polymerizable liquid crystal compound under a state in which a voltage is applied to the polymer dispersed liquid crystal layer.

The method of producing an optical film according to the third embodiment may further include arranging a second substrate on the side of the PDLC layer or the diffusion layer opposite to the side on which the first substrate is arranged (step IV) before or after polymerizing the polymerizable liquid crystal compound as required.

According to those methods, the optical film described in the section A (specifically, the optical film of the first embodiment) can be suitably obtained.

EXAMPLES

The present invention is specifically described below by way of Examples. However, the present invention is by no means limited to these Examples. Measurement methods for characteristics are as described below. In addition, unless otherwise specified, “part(s)” and “g” in Examples and Comparative Example are by weight.

(1) Thickness

Measurement was performed with a digital micrometer (manufactured by Anritsu Corporation, product name: “KC-351C”).

(2) Volume-Average Particle Diameter of Liquid Crystal Particles in Liquid Crystal Emulsion 0.1 Weight percent of a liquid crystal emulsion was added to 200 ml of an electrolyte aqueous solution (manufactured by Beckman Coulter, Inc., “Isoton II”), and the resultant mixed liquid was used as a measurement sample. The particle diameters of the liquid crystal particles in the sample were measured with Multisizer 3 (manufactured by Beckman Coulter, Inc., aperture size=20 μm), and the statistics of volumes were collected for each discretized particle diameter by dividing the measured values into 256 sections arranged at equal intervals in the range of from 0.4 μm to 12 μm on a logarithmic scale, followed by the calculation of the volume-average particle diameter of the particles. When particles each having a particle diameter of 12 μm or more were present, the volume-average particle diameter was calculated by: setting the aperture size to 30 μm; and dividing the measured values into 256 sections arranged at equal intervals in the range of from 0.6 μm to 18 μm on a logarithmic scale to collect the statistics of volumes for each discretized particle diameter.

(3) Average Particle Diameter of Resin Particles

Several droplets of a resin dispersion were added to 100 mL of water to prepare a measurement sample. The measurement sample was set in the measurement holder of a dynamic light scattering-type particle diameter distribution-measuring apparatus (manufactured by Microtrac Retsch GmbH, apparatus name: "NANOTRAC 150"), and the fact that the concentration of the measurement sample was measurable was recognized with the monitor of the apparatus, followed by the measurement of the average particle diameter of the resin particles with the apparatus.

(4) Haze

Measurement was performed with a product available under the product name "NDH 4000" from Nippon Denshoku Industries Co., Ltd. in accordance with JIS K 7136.

Example 1

(Production of Emulsion Application Liquid)

53.7 Parts of a non-polymerizable liquid crystal compound (manufactured by JNC Corporation, product name: "LX-153XX", birefringence Δn=0.149 (ne=1.651, no=1.502), viscosity=48.5 mPa·s), 5.9 parts of a polymerizable liquid crystal compound (manufactured by BASF SE, product name: "PALIOCOLOR LC-242"), 0.1 part of a photopolymerization initiator (manufactured by IGM Resins B.V., product name: "OMNIRAD 651"), 39.8 parts of pure water, and 0.5 part of a dispersant (manufactured by DKS Co. Ltd., product name: "NOIGEN ET159") were mixed, and the mixture was stirred with a homogenizer at 100 rpm for 10 minutes to prepare a liquid crystal emulsion. The average particle diameter of liquid crystal particles in the resultant liquid crystal emulsion was 3.4 μm.

38.4 Parts of the above-mentioned liquid crystal emulsion, 19.1 parts of a polyether-based polyurethane resin aqueous dispersion (manufactured by DSM JAPAN K.K., product name: "NeoRez R967", polymer average particle diameter: 80 nm, CV value=0.27, solid content: 40 wt %), 17.0 parts of a polyester-based polyurethane resin aqueous dispersion (manufactured by Sanyo Chemical Industries, Ltd., product name: "UCOAT C-102", polymer average particle diameter: 168 nm, CV value=0.23, solid content: 45 wt %), 0.1 part of a leveling agent (manufactured by DIC Corporation, product name: "F-444"), 1.1 parts of a cross-linking agent (propylidynetrimethyl tris [3-(2-methylaziridin-1-yl) propionate]), and 24.3 parts of pure water were mixed to provide an emulsion application liquid (solid content concentration: 40 wt %).

(Application and Drying of Emulsion Application Liquid)

The above-mentioned emulsion application liquid was applied to one surface of a PET film (thickness: 125 μm) serving as a first transparent substrate to form an applied layer having a thickness of 20 μm. The application was performed with a slot die, and a line speed was 6 m/min. Next, the applied layer was dried at 25° C. for 8 minutes to form a PDLC layer having a thickness of 8 μm.

(Lamination of Second Transparent Substrate)

While a lamination pressure of 0.4 MPa/m was applied with a laminator, a PET film (thickness: 125 μm) serving as a second transparent substrate was laminated on the above-mentioned PDLC layer. Thus, a laminate having the configuration [first transparent substrate/PDLC layer/second transparent substrate] was obtained. The resultant laminate showed a uniform haze (haze: 90%) over the entirety of a main surface.

(UV Irradiation)

A flat plate-shaped metal electrode including a recess having a depth of 2 mm in the upper surface thereof was used as a first electrode. The above-mentioned laminate was arranged on the upper surface of the first electrode so that the first transparent substrate was brought into contact therewith, and a glass substrate with ITO serving as a second electrode was arranged thereon so that an ITO surface was brought into contact with the second transparent substrate. Next, the resultant was subjected to exposure treatment under a UV-LED lamp (manufactured by Hamamatsu Photonics K.K., product name: "C11924-101", peak wavelength: 365 nm) at 10 mW/cm$^2$ at 25° C. for 10 minutes while a voltage of 2 kV was applied to the electrodes with a high-voltage power source. Thus, the polymerizable liquid crystal compound was polymerized to provide an optical film having the configuration [first transparent substrate/diffusion layer/second transparent substrate]. The interelectrode distance in a region (region I) corresponding to the recess of the first electrode was about 2,250 μm, and an electric field intensity thereof was 0.89 V/μm. In addition, the interelectrode distance in a region (region II) corresponding to a part except the recess of the first electrode was about 250 μm, and an electric field intensity thereof was 7.8 V/μm.

A haze of the resultant optical film was measured, and as a result, a haze of the region I was 90%, and a haze of the region II was 8%. In view of the foregoing, it is found that the alignment states of the liquid crystal polymer and the liquid crystal compound in the dispersed particles in the region I of the diffusion layer and the alignment states of the liquid crystal polymer and the liquid crystal compound in the dispersed particles in the region II are different from each other. More specifically, it is found that the alignment degrees of the liquid crystal polymer and the liquid crystal compound in the dispersed particles in the region I are lower than the alignment degrees thereof in the region II.

INDUSTRIAL APPLICABILITY

The optical film of the present invention is suitably used in various applications, such as a diffusion film and a designed film.

REFERENCE SIGNS LIST

100 optical film
10 diffusion layer
12 polymer matrix
14 dispersed particle
14' liquid crystal droplet
**14*a*** liquid crystal compound (non-polymerizable liquid crystal compound)
**14*b*** liquid crystal polymer
**14*c*** polymerizable liquid crystal compound
20 first transparent substrate
30 second transparent substrate
40 first electrode
50 second electrode
60 power source

The invention claimed is:

1. An optical film, comprising a diffusion layer including a polymer matrix and dispersed particles dispersed in the polymer matrix, the dispersed particles each containing a non-liquid-crystalline polymer that is a polymer of a polymerizable liquid crystal compound and a non-polymerizable liquid crystal compound serving as an optional component, wherein the diffusion layer includes a plurality of regions different from each other in alignment state of the non-liquid-crystalline polymer and/or in content ratio of the non-liquid-crystalline polymer.

2. The optical film according to claim 1, wherein the plurality of regions are aligned in a predetermined pattern.

3. The optical film according to claim 1, wherein a maximum value of differences between hazes of parts corresponding to the plurality of regions is 10% or more in plan view.

4. The optical film according to claim 1, wherein the dispersed particles each further contain the liquid crystal compound.

5. The optical film according to claim 4, wherein a content ratio of the non-liquid-crystalline polymer with respect to a total content of the non-liquid-crystalline polymer and the liquid crystal compound is 5 wt % or more.

6. The optical film according to claim 1, wherein a total content ratio of the non-liquid-crystalline polymer and the liquid crystal compound, when present, in the diffusion layer is from 30 wt % to 70 wt %.

7. The optical film according to claim 1, further comprising a first transparent substrate arranged on a first main surface side of the diffusion layer.

8. The optical film according to claim 1, further comprising a second transparent substrate arranged on a second main surface side of the diffusion layer.

9. The optical film according to claim 1, wherein the optical film is free of an electrode layer.

10. An optical film, comprising a diffusion layer including a polymer matrix and dispersed particles dispersed in the polymer matrix, the dispersed particles each containing a non-liquid-crystalline polymer that is a polymer of a polymerizable liquid crystal compound, wherein the optical film includes a plurality of regions exhibiting hazes different from each other in accordance with an alignment state of the non-liquid-crystalline polymer in plan view.

11. An optical film, comprising a diffusion layer including a polymer matrix and dispersed particles dispersed in the polymer matrix, wherein the diffusion layer includes:

a region including dispersed particles each containing a polymerizable liquid crystal compound; and a region including dispersed particles each containing a non-liquid-crystalline polymer that is a polymer of the polymerizable liquid crystal compound, and wherein those regions exhibit hazes different from each other in plan view.

12. A method of producing an optical film, including:

applying, to a first substrate, an application liquid containing a resin for forming a polymer matrix, a polymerizable liquid crystal compound, and a solvent to provide an applied layer;

drying the applied layer to provide a polymer dispersed liquid crystal layer including a polymer matrix and droplets dispersed in the polymer matrix, the droplets each containing the polymerizable liquid crystal compound; and polymerizing the polymerizable liquid crystal compound while applying a voltage from a first main surface side and a second main surface side of the polymer dispersed liquid crystal layer so as to generate regions different from each other in electric field intensity, wherein the polymerizing fixes an alignment state of the polymerizable liquid crystal compound in the regions to form a non-liquid-crystalline polymer having a fixed alignment state, thereby forming a diffusion layer including a plurality of regions different from each other in alignment state of the non-liquid-crystalline polymer.

13. The method of producing an optical film according to claim 12, wherein the application of the voltage is performed with a first electrode arranged on the first main surface side of the polymer dispersed liquid crystal layer and a second electrode arranged on the second main surface side thereof, and wherein a separation distance between the first electrode and the second electrode is controlled so as to generate the regions different from each other in electric field intensity.

14. A method of producing an optical film, comprising:

applying, to a first substrate, an application liquid containing a resin for forming a polymer matrix, a polymerizable liquid crystal compound, and a solvent to provide an applied layer;

drying the applied layer to provide a polymer dispersed liquid crystal layer including a polymer matrix and droplets dispersed in the polymer matrix, the droplets each containing the polymerizable liquid crystal compound; and irradiating a predetermined region with an active energy ray under a state in which a voltage is applied to the polymer dispersed liquid crystal layer to polymerize the polymerizable liquid crystal compound, wherein the irradiating polymerizes the polymerizable liquid crystal compound in the predetermined region while leaving a non-irradiated region containing unpolymerized polymerizable liquid crystal compound, thereby forming regions exhibiting hazes different from each other in plan view.

15. The method of producing an optical film according to claim 12, wherein the application liquid is an emulsion containing, as a dispersoid, liquid crystal particles each containing the polymerizable liquid crystal compound.

16. The method of producing an optical film according to claim 12, wherein the application liquid further contains a non-polymerizable liquid crystal compound.

* * * * *